United States Patent [19]
Mimlitch et al.

[11] Patent Number: 5,171,978
[45] Date of Patent: Dec. 15, 1992

[54] TRACKBALL ASSEMBLY INCLUDING A LOOSELY MOUNTED BALL SUPPORT

[75] Inventors: Kenneth H. Mimlitch; Edward E. Pollard, both of Lexington, Ky.

[73] Assignee: Lexmark International, Inc., Greenwich, Conn.

[21] Appl. No.: 796,296

[22] Filed: Nov. 22, 1991

[51] Int. Cl.$^5$ .................. G01V 9/04; G05G 9/053; G09G 5/00
[52] U.S. Cl. .................. 250/221; 250/231.14; 340/710; 74/198; 74/471 XY
[58] Field of Search .................. 250/221, 231.14, 239; 340/706, 709, 710; 74/198, 471 XY

[56] References Cited

U.S. PATENT DOCUMENTS

| | | | |
|---|---|---|---|
| 4,538,476 | 9/1985 | Luque | 74/471 XY |
| 4,562,347 | 12/1985 | Hovey et al. | 250/221 |
| 4,952,919 | 8/1990 | Nippoldt | 340/710 |
| 5,008,528 | 4/1991 | Duchon | 250/221 |
| 5,122,654 | 6/1992 | Koh et al. | 250/221 |

*Primary Examiner*—David C. Nelms
*Assistant Examiner*—John R. Lee
*Attorney, Agent, or Firm*—Frank C. Leach, Jr.

[57] ABSTRACT

A trackball assembly has a ball supported on a bottom ball support, which is rotatably and translationally mounted on a lower support having an upper support conntected thereto. The ball protrudes through an opening, which has a beveled inner surface, in a retaining cap releasably secured to an upper wall of the upper support to enable manipulation of the ball by a user to position a pointer on a computer screen. The amount and direction of movement of the ball during its rotation in each of X and Y coordinate directions are sensed by two silicone rubber rollers, which are substantially perpendicular to each other, engaging the ball. Each roller is mounted on a metal shaft, which extends through an enlarged hole in a shaft support mounted on the lower support to enable limited pivoting of the shaft and the roller thereon. The amount of pivoting of each of the shafts towards the ball by the force of a magnet, which is supported on the bottom of the bottom ball support, is limited by a retaining portion of the bottom ball support. Each of the shafts has an encoder wheel mounted thereon for cooperation with photosources and photodetectors mounted on the lower support. The photosources and the photodetectors enable determination of the amount and direction of movement of the ball in each of the X and Y directions during any rotation of the ball.

20 Claims, 6 Drawing Sheets

TRACKBALL ASSEMBLY INCLUDING A LOOSELY MOUNTED BALL SUPPORT

FIELD OF THE INVENTION

This invention relates to a trackball assembly and, more particularly, to a trackball assembly having a self-aligned ball and a unique arrangement for engaging the ball at two substantially perpendicular positions with substantially equal forces.

BACKGROUND OF THE INVENTION

A trackball assembly has a ball for controlling the position of a pointer on a screen of a computer. Rotation of the ball by the user is transferred into two orthogonal directions such as X and Y coordinate directions, for example, to move the pointer on the computer screen in the X and Y directions. Transfer of rotation of the ball into the X and Y directions is obtained through having two rollers, which are perpendicular to each other, engaging the ball. Each of U.S. Pat. No. 4,562,347 to Hovey et al and U.S. Pat. No. 5,008,528 to Duchon discloses each of two perpendicular rollers being resiliently biased by a separate spring into engagement with the ball of the trackball assembly.

One problem with the spring loaded rollers is that it is difficult to manufacture relatively small springs with the same loading force. When the spring forces are not equal, the rollers will not always correctly sense the amount of movement in each of the X and Y directions. This is because a different frictional force will exist between each of the rollers and the ball whereby one of the rollers will turn more in response to the same amount of ball rotation in each of the X and Y directions than the other of the rollers. When rotation of the ball produces movement in only one of the X and Y directions, the roller with the higher spring force may not slip as required; thus, the roller would incorrectly indicate there is movement in the direction in which it is sensing when there is not.

Another problem with having a spring exert a force on each of the rollers is that the spring can create a substantial force on the roller. This causes wear of the elastomeric material of the roller. It also can cause the elastomeric material to take a set resulting in a flat spot on the roller.

A further problem with the use of a spring to load each of the rollers is that there is a limit as to reducing the size of a spring while still producing a desired force. Thus, miniaturization of the trackball assembly cannot be accomplished where space is limited.

Another problem with a trackball assembly is that the ball will not float freely within defined constraints to allow self alignment of the ball within its retaining cap or cover. Large tolerances resulting in building the overall trackball assembly prevent the ball from centering within the cap or cover and cause the ball to bind. Twisting of the trackball assembly by mounting forces can also cause the ball to bind.

One previous arrangement to eliminate binding of the ball has been to use a spring loaded cap or cover. However, the spring loaded cap or cover is expensive and produces non-uniform forces on the ball in multiple directions so as to cause drag on the ball. Additionally, with the spring loaded cap in which a leaf spring is mounted in the cap to act on the ball, miniaturization of the trackball assembly cannot be obtained practically or inexpensively. Another prior arrangement to eliminate binding of the ball has been to incorporate expensive machining operations to reduce the tolerance build up to facilitate centering of the ball within the cap or cover.

SUMMARY OF THE INVENTION

The trackball assembly of the present invention satisfactorily solves the foregoing problems of spring loading the ball engaging rollers by eliminating the use of a spring for loading each of the rollers engaging the ball to determine the amount and direction of movement of the ball in each of two orthogonal directions. The trackball assembly of the present invention also overcomes the problem of the ball binding in the opening through which the ball protrudes by having the ball self-aligned.

The use of a separate spring loading each of the two rollers, which are substantially perpendicular to each other, is eliminated by the trackball assembly of the present invention through using non-resilient means, which is preferably a magnet, to exert a substantially equal force on each of the two metal shafts to move a roller mounted on each shaft into engagement with the ball with substantially the same force. Therefore, a substantially constant load force is applied to each of the rollers. In addition to being substantially constant, this force is relatively low to reduce the wear of the rollers to increase their life. The substantially constant load force is due to the low rate of change in force created by a magnet in comparison with the rate of change produced by presently available springs. The use of a magnet also permits miniaturization of the trackball assembly of the present invention when space is constricted.

The ball of the trackball assembly of the present invention has a bottom ball support, which floats freely within defined constraints to allow the ball to be self-aligned within an opening in a cap releasably retained on a cover or an integral cap-cover combination. The cover comprises an upper support connected to a lower support, which includes a printed circuit board. The free floating of the bottom ball support is preferably accomplished by mounting the bottom ball support on the lower support so that the bottom ball support can rotate and translate a limited amount. The amount of movement of the bottom ball support is preferably limited by the encoder wheel subassembly of each of the two rollers.

An object of this invention is to provide a trackball assembly having freer movement of its ball.

Another object of this invention is to provide a trackball assembly having a uniquely loaded ball.

A further object of this invention is to provide a trackball assembly having a self-aligning ball support.

Still another object of this invention is to provide a trackball assembly having a floating support for the bottom of the ball.

A still further object of this invention is to provide a trackball assembly having its sensing rollers uniformly loaded by a non-resilient loading arrangement.

Other objects of this invention will be readily perceived from the following description, claims, and drawings.

DETAILED DESCRIPTION

Figure 1:
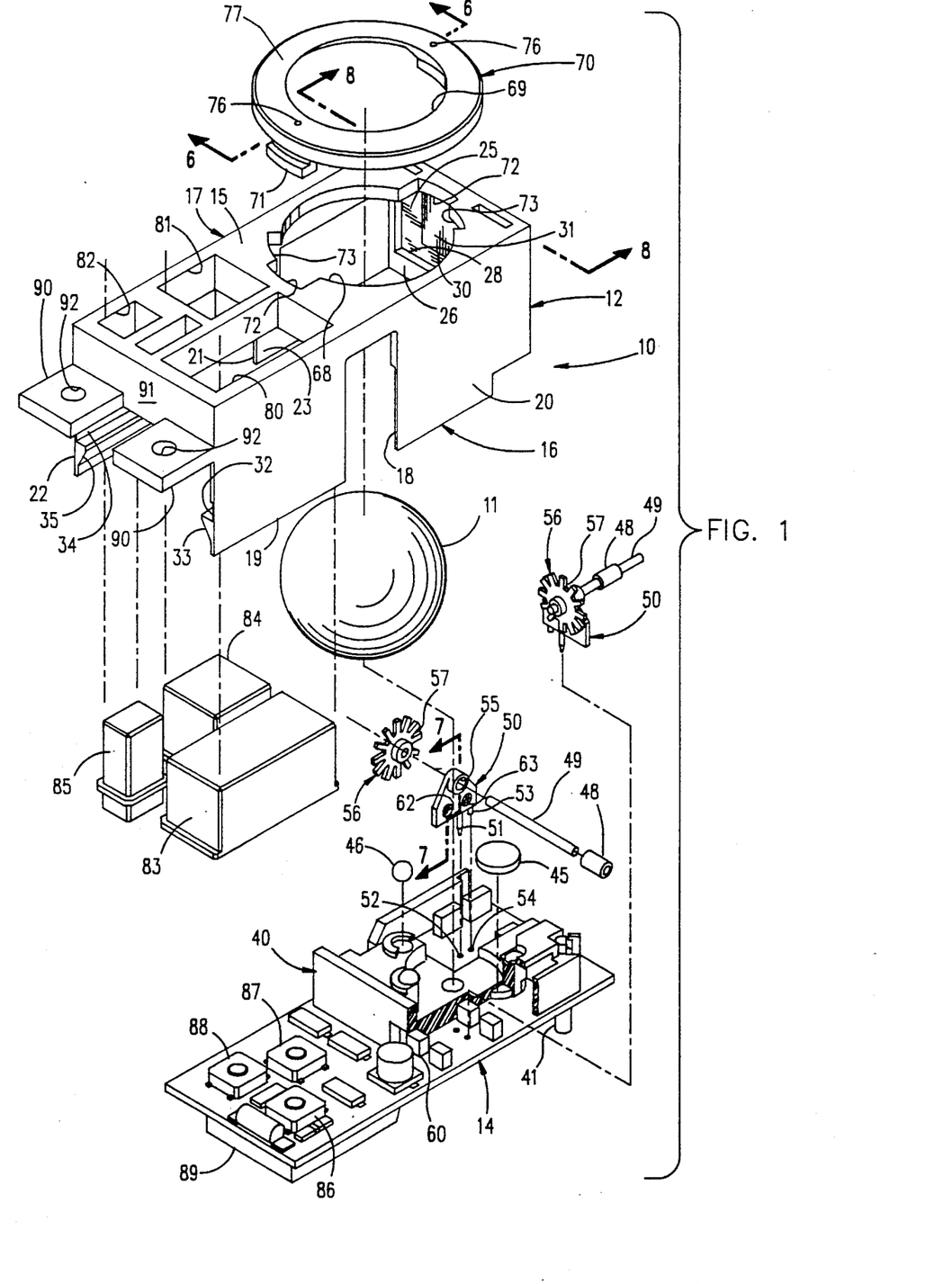
FIG. 1 is an exploded perspective view of a trackball assembly of the present invention.

Referring to the drawings and particularly FIG. 1, there is shown a trackball assembly 10 having a ball 11, which is preferably formed of steel coated with an epoxy. A cover 12, which functions as an upper support, and a printed circuit board 14, which functions as a lower support, are connected to each other with the ball 11 disposed therebetween.

The cover 12, which is preferably formed of polycarbonate and ABS sold by Dow Chemical as PULSE 1725, includes an upper wall 15 having substantially parallel side walls 16 and 17 extending downwardly therefrom substantially perpendicular to the upper wall 15. The side wall 16 has a slot 18 to form spaced side wall portions 19 and 20 to enable the side wall portion 19 to move relative to the side wall portion 20 when the printed circuit board 14 is inserted within the cover 12 to be connected to the cover 12. Similarly, the wall 17 has a slot 21 to form spaced side wall portions 22 and 23 so that the side wall portion 22 can move relative to the side wall portion 23 when the printed circuit board 14 is inserted within the cover 12 for connection thereto.

Figure 8:
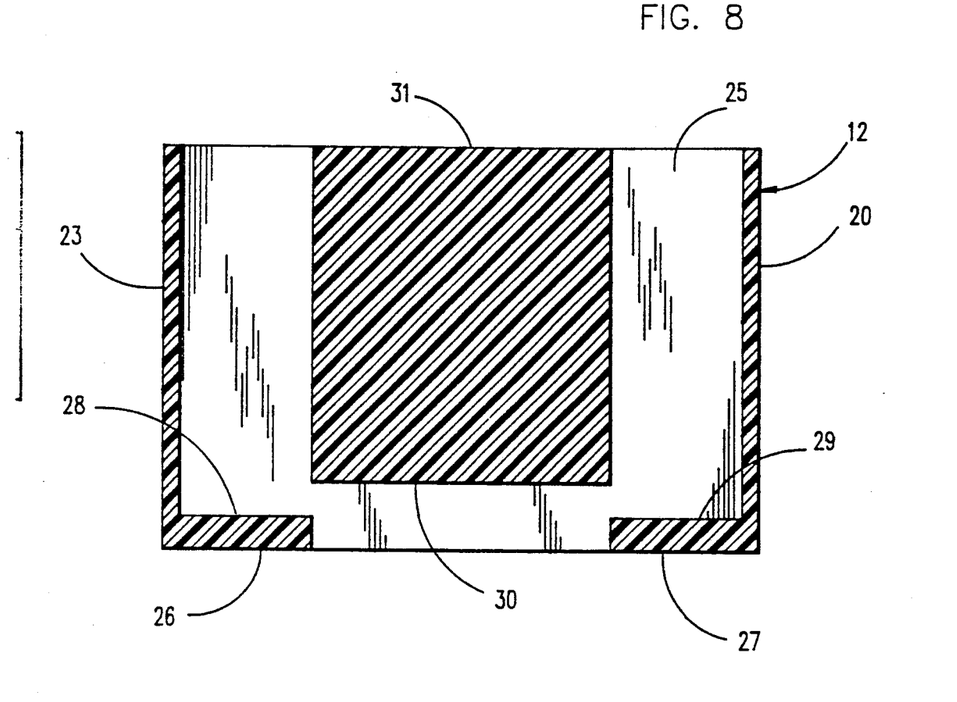
FIG. 8 is a sectional view, partly in elevation, of one end of a cover of the trackball assembly of the present invention and taken along line 8—8 of FIG. 1.

The cover 12 has an end wall 25, which is substantially perpendicular to the upper wall 15 and the side walls 16 and 17, joining the side wall portions 20 and 23 to each other. The end wall 25 has a pair of projecting lugs or blocks 26 and 27 (see FIG. 8) adjacent its bottom. The projecting lugs 26 and 27 have upper surfaces 28 and 29, respectively, spaced a selected distance from a bottom surface 30 of a large inwardly projecting block 31 on the end wall 25. The upper surfaces 28 and 29 of the projecting lugs 26 and 27, respectively, on the end wall 25 and the bottom surface 30 of the block 31 on the end wall 25 cooperate to retain one end of the printed circuit board 14 (see FIG. 1) therebetween.

Figure 10:
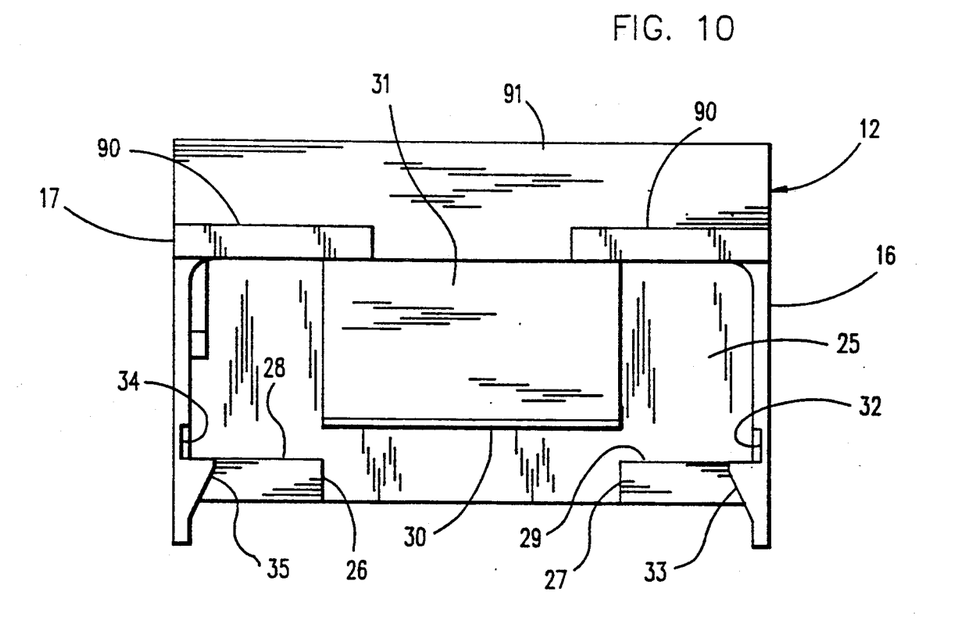
FIG. 10 is an end elevational view of the cover of the trackball assembly of the present invention.

The side wall portion 19 has a groove 32 formed in its inner surface with a cam surface 33 therebeneath. Likewise, the side wall portion 22 has a groove 34 (see FIG. 10) in its inner surface with a cam surface 35 beneath it. Thus, after the end of the printed circuit board 14 (see FIG. 1) is inserted between the upper surfaces 28 (see FIG. 8) and 29 of the projecting lugs 26 and 27, respectively, on the end wall 25 and the bottom surface 30 of the block 31 on the end wall 25 of the cover 12, the printed circuit board 14 (see FIG. 1) is pivoted towards the grooves 32 and 34 against the camming surfaces 33 and 35 to force the side wall portions 19 and 22 away from each other so that the sides of the printed circuit board 14 can move into the grooves 32 and 34. As shown in FIG. 10, the grooves 32 and 34 are aligned horizontally with the space between the upper surfaces 28 and 29 of the projecting lugs 26 and 27, respectively, on the end wall 25 of the cover 12 and the bottom surface 30 of the block 31 on the end wall 25 of the cover 12. This arrangement connects the printed circuit board 14 (see FIG. 1) to the cover 12.

During positioning of the printed circuit board 14 within the cover 12, the cover 12 is disposed beneath the printed circuit board 14. After the printed circuit board 14 is connected to the cover 12, the trackball assembly 10 is inverted so that the cover 12 is above the printed circuit board 14.

Figure 11:
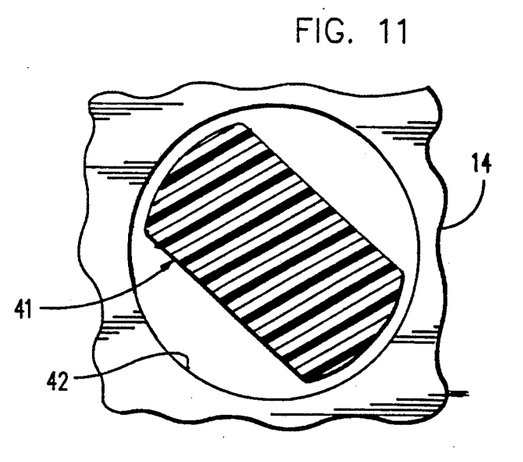
FIG. 11 is an enlarged fragmentary top plan view, partly in section, of a portion of a lower support of the trackball assembly of the present invention having an opening with a pin on the bottom ball support of FIG. 5 disposed therein.

The printed circuit board 14 has a support housing 40, which supports the bottom of the ball 11, mounted thereon by a downwardly extending pin 41 (see FIG. 2) of non-circular shape extending through a circular opening 42 in the printed circuit board 14. The size of the opening 42 (see FIG. 11) is slightly larger than the pin 41 so that the pin 41 can not only rotate in the opening 42 but also can translate relative thereto. This translational motion of the pin 41 aids in alignment of the ball 11 (see FIG. 1) since it permits a slight radial motion of the ball support housing 40 in addition to rotation thereof. For example, the opening 42 (see FIG. 11) can have a diameter of 2.2 millimeters while each of the arcs on opposite ends of pin 41 can have a radius 1 millimeter with the pin 41 having a width of 1.12 millimeters.

Figure 5:
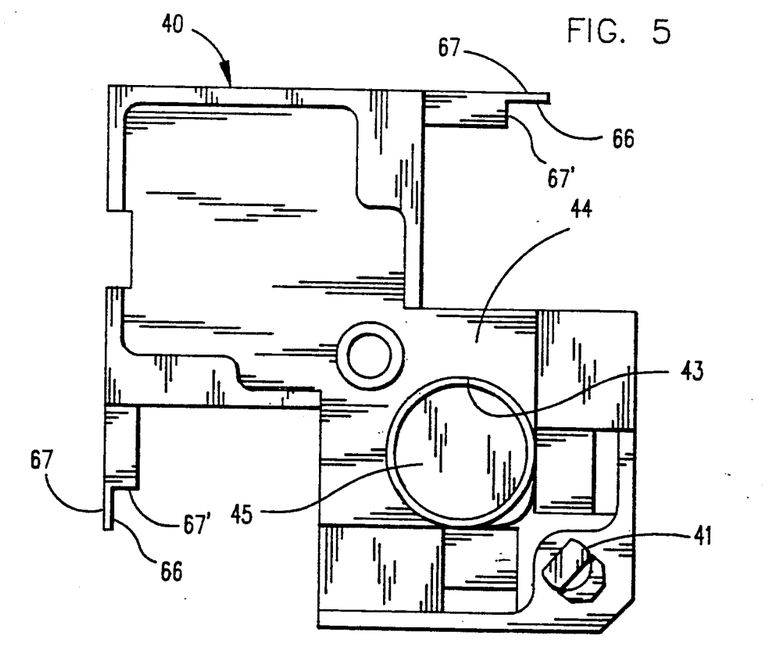
FIG. 5 is a bottom plan view of the bottom ball support of FIG. 4.

The support housing 40 (see FIG. 5) has a circular recess 43 in its bottom 44 to receive a magnet 45. One suitable example of the magnet 45 is a 3/16" rare earth magnet sold by Radio Shack as Archer Catalog No. 64-1895.

The magnet 45 is held within the recess 43 during assembly by a paper (not shown) having an adhesive on one side and larger than the recess 43 through the adhesive adhering to the bottom 44 of the support housing 40. The paper also insulates the magnet 45 from the printed circuit board 14 (see FIG. 1). One suitable example of the paper having an adhesive on one side is a ¼" round permanent adhesive label sold by Avery-Dennison as Part No. TD 5731.

Figure 2:
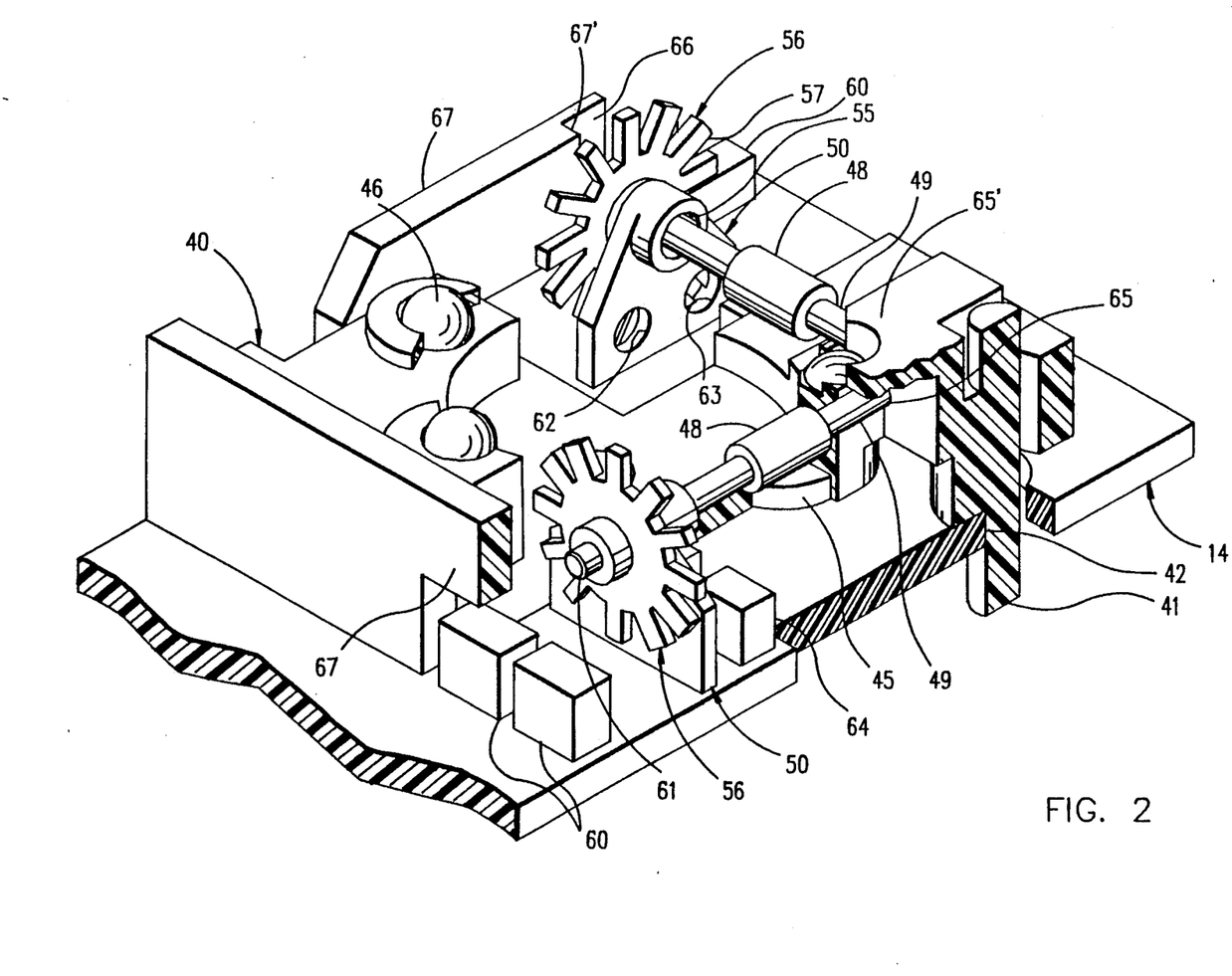
FIG. 2 is a perspective view of a portion of the trackball assembly of FIG. 1.
Figure 3:
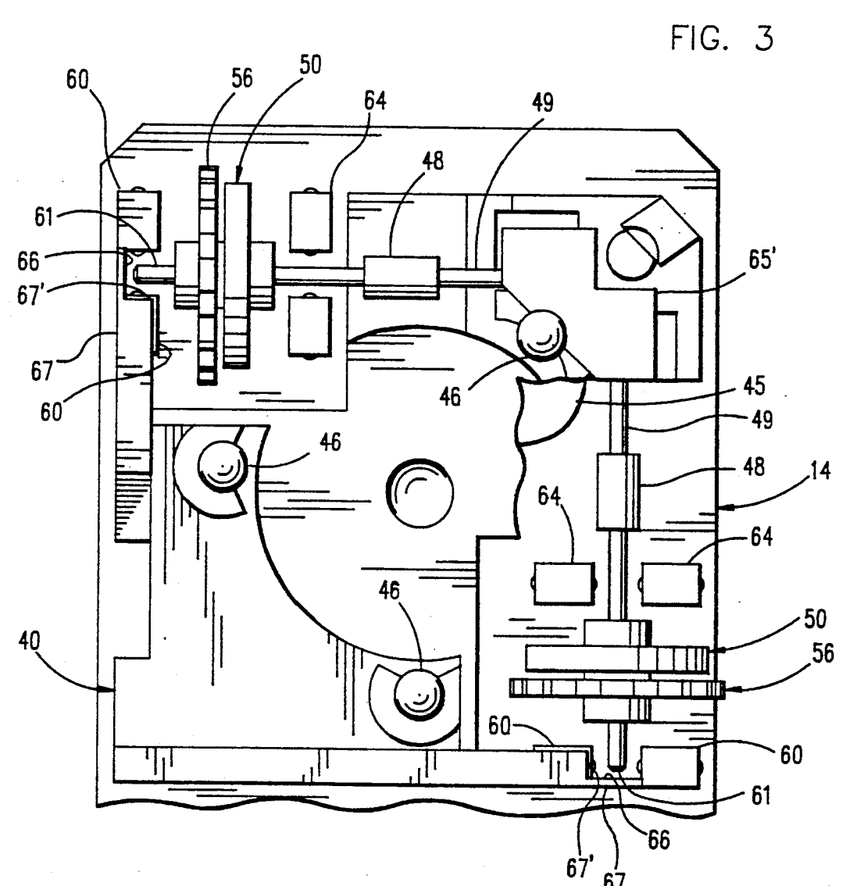
FIG. 3 is a top plan view of a portion of the trackball assembly of FIG. 1.
Figure 4:
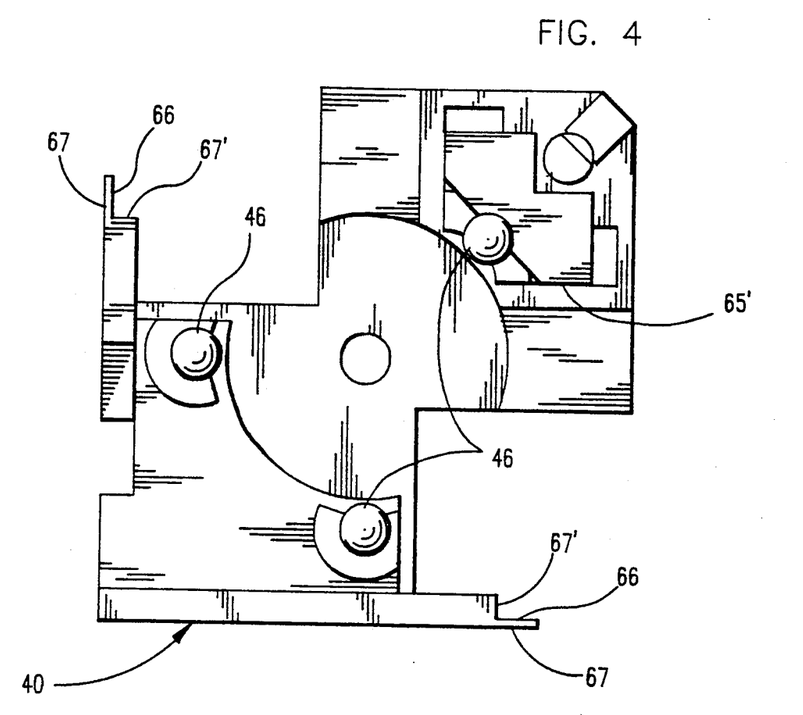
FIG. 4 is a top plan view of a bottom ball support of the trackball assembly of FIG. 1.

The support housing 40 has three ball bearings 46 (see FIG. 4) mounted on its upper side in the same horizontal plane to support the bottom of the ball 11 (see FIG. 1) so that the ball 11 is disposed to engage two silicone rubber rollers 48 (see FIG. 2). As shown in FIG. 3, the rollers 48 are substantially orthogonal to each other through each of the rollers 48 being press fitted on a steel shaft 49. The shafts 49 are disposed substantially perpendicular to each other although they can move slightly relative to each other.

Each of the shafts 49 is pivotally supported by a shaft support 50 (see FIG. 3), which is mounted on the printed circuit board 14 through having a pin 51 (see FIG. 1), which extends from the bottom of the shaft support 50, tapered at its bottom end for easy disposition in a circular hole 52 in the printed circuit board 14. To prevent rotation of the shaft support 50, which is preferably formed of an acetal resin such as Delrin, for example, a cylindrical pin 53, which also extends from the bottom of the shaft support 50, extends into an opening 54 in the printed circuit board 14.

Figure 7:
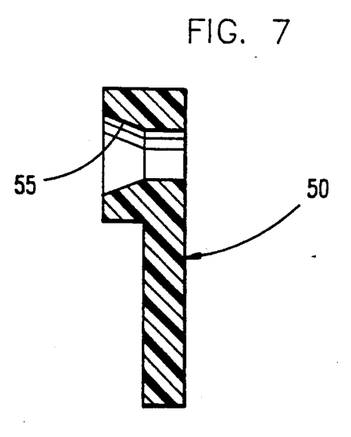
FIG. 7 is a sectional view of a roller shaft support of the trackball assembly of the present invention showing its support arrangement for the roller shaft and taken along line 7—7 of FIG. 1.

The shaft 49 extends through a passage 55 (see FIG. 7), which is tapered inwardly to a constant minimum diameter, in the shaft support 50. The constant minimum diameter of the passage 55 is slightly larger than the shaft 49 (see FIG. 1) so that the shaft 49 can pivot relative to the shaft support 50. For example, the shaft 49 has a diameter of one millimeter and the constant minimum diameter of the passage 55 (see FIG. 7) is 1.1 millimeters.

Each of the shafts 49 (see FIG. 1) has an encoder wheel 56, which is preferably formed of polypropylene, press fitted thereon for rotation with the shaft 49 and disposed on the opposite side of the shaft support 50 from the roller 48. The encoder wheel 56 has a plurality of equally angularly spaced slits 57 in its periphery.

A pair of photosources 60 (see FIG. 3), which are preferably LEDs, is mounted on the printed circuit board 14 on opposite sides of each of the shafts 49 adjacent its end 61. The light from each of the photosources 60 passes through one of two openings 62 (see FIG. 1) and 63 in each of the shaft supports 50 prior to passing through the slits 57 in the encoder wheel 56 as the encoder wheel 56 rotates each of the slits 57 past each of the two beams of light produced from the two photosources 60 (see FIG. 3).

A pair of photodetectors 64, which are mounted on the printed circuit board 14, is disposed between the encoder wheel 56 and the roller 48. Each of the photodetectors 64 is aligned with one of the photosources 60 to receive the light therefrom passing through one of the openings 62 (see FIG. 1) and 63 in the shaft support 50.

Accordingly, the amount and direction of rotation of each of the rollers 48 by rotation of the ball 11 is determined by the number of pulses received by the photodetectors 64 (see FIG. 2) after the light from the photosources 60 passes through the slits 57 in the rotating encoder wheel 56. The pulses received by one of the pair of the photodetectors 64 will lead the pulses received by the other of the pair of the photodetectors 64 depending on the direction of rotation of the roller 48.

Since one of the shafts 49 is substantially aligned in the X direction and the other of the shafts 49 is substantially aligned in the Y-direction, a computer, which is connected to the output pins of the printed circuit board 14 by a cable, can use the output of the printed circuit board 14 to move a pointer on its screen the amount that the ball 11 (see FIG. 1) causes rotation of the roller 48 aligned in the X direction and the amount that the ball 11 causes rotation of the roller 48 aligned in the Y direction.

The magnet 45 (see FIG. 2) exerts a uniform and constant force on each of the shafts 49 to hold each of the rollers 48 against the ball 11 (see FIG. 1) with substantially the same low load force. This insures that there is the desired contact of each of the two rollers 48 with the ball 11 while still permitting slippage between the ball 11 and one of the rollers 48 when the ball 11 is rotated so as to move the pointer in only the X or Y direction.

Each of the shafts 49 has its end 65 (see FIG. 2), which is remote from encoder wheel 56, disposed beneath a retaining portion 65' on the upper side of the support housing 40. This allows pivoting of each of the shafts 49 without having the end 65 cease to be retained while also limiting the maximum movement of each of the rollers 48 by the magnet 45 towards the ball 11 (see FIG. 1).

The shaft support 50 limits pivoting of the shaft 49, which passes through the passage 55, away from the ball 11. Axial motion of each of the shafts 49 is limited by the end 61 (see FIG. 3) of the shaft 49 engaging a flat end surface 66 of one of two substantially perpendicular fingers 67 of the support housing 40.

Each of the shafts 49 has the and 61 positioned for engagement by a flat end surface 67' of the support housing 40 to limit the amount of movement of the support housing 40 about the pin 41 (see FIG. 2). Each of the flat end surfaces 67' is a shoulder formed on the finger 67, which extends over one of the corresponding pair of the photosources 60.

With the ball 11 (see FIG. 1) resting on the ball bearings 46 on the support housing 40, a portion of the ball 11 extends through an opening 68 in the upper wall 15 of the cover 12 and through an opening 69 in a retaining cap 70, which is preferably formed of a polyester sold by General Electric as Valox 325. The retaining cap 70 has a pair of diametrically disposed mounting tabs 71, which are received within a pair of diametrically disposed slots 72 in the opening 68 in the upper wall 15 of the cover 12.

Figure 9:
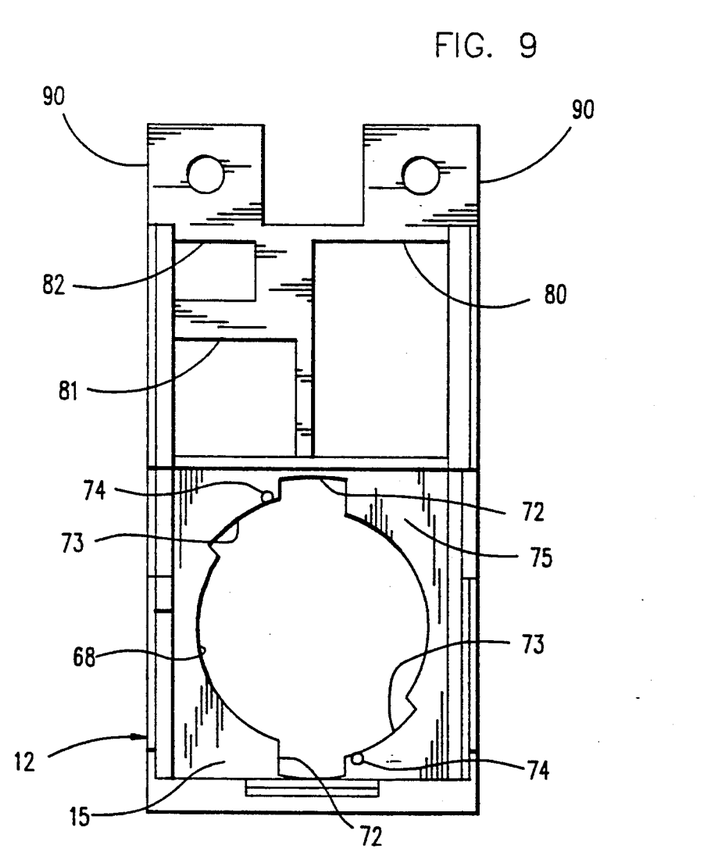
FIG. 9 is a bottom plan view of the cover of the trackball assembly of the present invention and showing dimples for holding the retaining cap on the cover.

The opening 68 has two diametrically disposed latching areas 73 of larger diameter than the opening 68 but smaller than the slots 72. Each of the latching areas 73 begins at one end of one of the slots 72. A dimple 74 (see FIG. 9) is formed in bottom surface 75 of the upper wall 15 of the cover 12 adjacent the junction of each of the slots 72 and the adjacent latching area 73.

Thus, when the retaining cap 70 (see FIG. 1) has each of the mounting tabs 71 disposed in one of the slots 72 and is rotated clockwise (as viewed in FIG. 1), each of the mounting tabs 71 will pass over one of the dimples 74 (see FIG. 9) and be disposed in the latching area 73 beneath the upper wall 15 (see FIG. 1) of the cover 12 to be retained thereon. This holds the retaining cap 70 on the cover 12.

When the retaining cap 70 is to be removed from the cover 12, the retaining cap 70 is rotated counterclockwise (as viewed in FIG. 1) so that each of the mounting tabs 71 moves from the latching area 73 past the dimple 74 (see FIG. 9) until each of the mounting tabs 71 (see FIG. 1) aligns with one of the slots 72. The alignment of the mounting tabs 71 with the slots 72 permits removal of the retaining cap 70 from the cover 12.

The retaining cap 70 has a pair of diametrically disposed recesses 76 in its upper surface 77. The size of each of the recesses 76 is such that each of the recesses 76 can receive a ball pen point, for example, to enable turning of the retaining cap 70.

Figure 6:
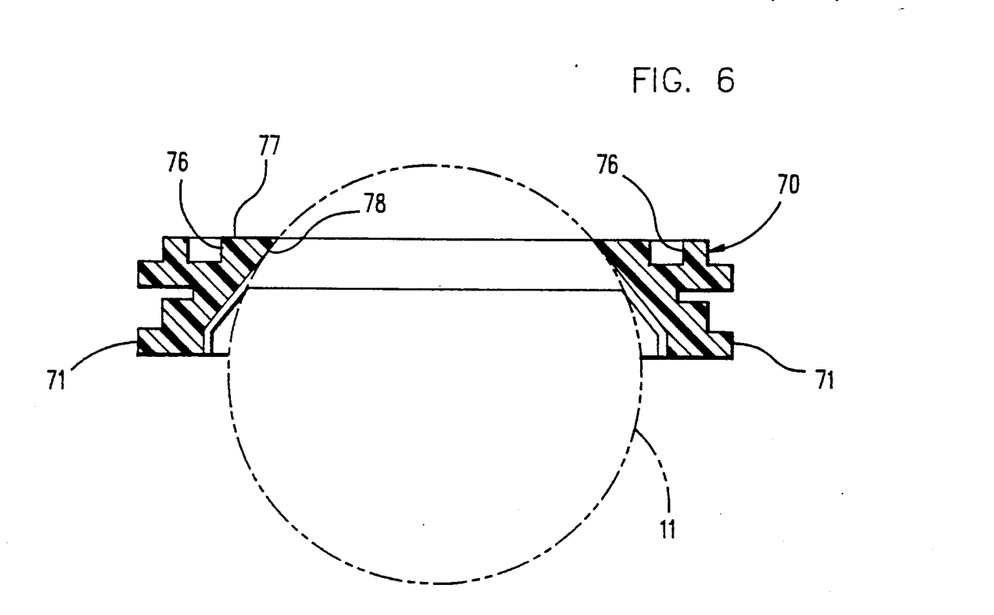
FIG. 6 is a sectional view of a retaining cap for the ball of the trackball assembly of the present invention taken along line 6—6 of FIG. 1 and showing the ball in phantom.

As shown in FIG. 6, the retaining cap 70 has an inner beveled surface 78 against which the ball 11 rests. The beveled surface 78 enables centering of the ball 11 with respect to the retaining cap 70. Thus, the ball 11 is self aligned between the support housing 40 (see FIG. 1) and the retaining cap 70.

The upper wall 15 of the cover 12 has three enlarged openings 80, 81, and 82 extending therethrough to receive three buttons 83, 84, and 85, respectively, for slidable movement therein. The button 83 is an ENTER button, the button 84 is a RESET button, and the button 85 is a DRAG LOCK button.

The buttons 83, 84, and 85 cooperate with switches 86, 87, and 88, respectively, on the printed circuit board 14. The switches 86–88 are connected to input pins of a microprocessor 89, which is supported by the printed circuit board 14 and is preferably an Intel 80C51 microprocessor. As is well known, the DRAG LOCK button 85 is used to continuously hold the ENTER switch circuit closed so that the area to which the pointer is pointing on the computer screen can be moved or marked by the ball 11 when the DRAG LOCK button 85 is depressed.

The cover 12 has a pair of ears 90 extending from its end wall 91, which is substantially parallel to the end wall 25 and substantially perpendicular to the upper wall 15. Each of the ears 90 has a hole 92 to receive a screw for mounting the trackball assembly 10 on a computer.

The trackball assembly 10 also may be mounted on a keyboard of a computer through changing the shape of the cover 12. Furthermore, with the cover 12, the trackball assembly 10 also may be free standing and connected solely by a cable from the printed circuit board 14 to the computer.

During rotation of the ball 11, the amount of movement in each of the X and Y directions is sensed by the amount of rotation of the corresponding roller 48. the pulses produced by the encoding wheel 56 on the shaft 49 having the roller 48 are counted to determine the amount of movement in the X or Y direction. The direction of rotation of the roller 48 is determined by which of the two photosources 60 (see FIG. 3) has its pulses leading the other.

Tests have been conducted in which the trackball assembly 10 (see FIG. 1) has been compared with a prior trackball assembly using a single spring to bias both of the rollers toward the ball and having a fixed support for the bottom of the ball. These tests showed a 60% decrease by the trackball assembly 10 in slippage as compared to the prior trackball assembly and a 32% decrease in variation of movement of the pointer relative to the rotation of the ball 11.

While only the single magnet 45 (see FIG. 2) has been used, it should be understood that two magnets, one for each of the shafts 49, could be employed if desired. These would be located so that each magnet would exert the same substantially constant load force on the shaft 49 with which it cooperates.

While the pin 41 has been shown and described as being adjacent a corner of the support housing 40, it should be understood that the pin 41 could be located at the intersection of the axes of the two shafts 49.

An advantage of this invention is that each encoder shaft of a trackball assembly is loaded independently with an equal force. Another advantage of this invention is that it increases the life of the ball motion sensing rollers of a trackball assembly through applying a lower uniform force. A further advantage of this invention is that it allows miniaturization of a trackball assembly when desired. Still another advantage of this invention is that a ball of a trackball assembly has a freer movement through avoiding binding and reducing friction force on the ball.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A trackball assembly including:
    a lower support;
    an upper support connected to said lower support;
    a bottom ball support;
    a ball having its bottom supported on said bottom ball support;
    said upper support having an opening through which a portion of said ball protrudes for rotational manipulation by a user;
    mounting means for loosely mounting said bottom ball support on said lower support for at least one of rotational and translational movement of said bottom ball support for enabling the self alignment of said ball with said opening in said upper support; and
    sensing means supported by said lower support for sensing the amount and direction of movement of said ball in each of two orthogonal directions during rotation of said ball.

2. The trackball assembly according to claim 1 including:
    said sensing means including:
        first engaging means for engaging said ball;
        second engaging means disposed substantially perpendicular to said first engaging means for engaging said ball at a position substantially perpendicular to said first engaging means;
        first responsive means responsive to the amount and direction of movement of said first engaging means for enabling determination of the amount and direction of movement of said ball in one of the two orthogonal directions during rotation of said ball;
        and second responsive means responsive to the amount and direction of movement of said second engaging means for enabling determination of the amount and direction of movement of said ball in the other of the two orthogonal directions during rotation of said ball; and
    non-resilient means supported by said bottom ball support for continuously urging each of said first engaging means and said second engaging means into engagement with said ball with a substantially constant force.

3. The trackball assembly according to claim 2 in which:
    said first engaging means includes a rotatably mounted roller for engaging said ball;
    said second engaging means includes a rotatably mounted roller for engaging said ball, said roller of said first engaging means being disposed substantially perpendicular to said roller of said second engaging means;
    said first responsive means includes first encoding means responsive to the amount and direction of rotation of said roller of said first engaging means by said ball during rotation of said ball; and
    said second responsive means includes second encoding means responsive to the amount and direction of rotation of said roller of said second engaging means by said ball during rotation of said ball.

4. The trackball assembly according to claim 3 in which said non-resilient means is a magnet supported on said bottom ball support, said magnet exerting a substantially equal magnetic force on each of said roller of said first engaging means and said roller of said second engaging means to continuously urge each of said roller of said first engaging means and said roller of said second engaging means into engagement with said ball.

5. The trackball assembly according to claim 4 in which said bottom ball support includes:
   a support mounted on said lower support by said mounting means; and
   a plurality of spaced ball engaging elements mounted on said support for engaging the bottom of said ball to support said ball.

6. The trackball assembly according to claim 5 in which:
   said first engaging means includes a metal shaft rotatably supported by said lower support;
   said shaft of said first engaging means having said roller of said first engaging means mounted thereon for rotation therewith;
   said roller of said first engaging means is formed of a non-metallic material;
   said second engaging means includes a metal shaft rotatably supported by said lower support;
   said shaft of said second engaging means having said roller of said second engaging means mounted thereon for rotation therewith; and
   said roller of said second engaging means is formed of a non-metallic material.

7. The trackball assembly according to claim 6 including:
   first support means for supporitng said shaft of said first engaging means;
   first mounting means for mounting said first support means on said lower support;
   second support means for supporting said shaft of said second engaging means; and
   second mounting means for mounting said second support means on said lower support.

8. The trackball assembly according to claim 7 including:
   said first support means including pivotal mounting means for pivotally mounting said shaft of said first engaging means to enable pivoting of said shaft of said first engaging means;
   said second support means including pivotal mounting means for pivotally mounting said shaft of said second engaging means to enable pivoting of said shaft of said second engaging means; and
   said support of said bottom ball support having limit means for limiting pivotal movement of said shaft of said first engaging means toward said ball on said bottom ball support and for limiting pivotal movement of said shaft of said second engaging means toward said ball on said bottom ball support.

9. The trackball assembly according to claim 4 in which:
   said first engaging means includes a metal shaft rotatably supported by said lower support;
   said shaft of said first engaging means having said roller of said first engaging means mounted thereon for rotation therewith;
   said roller of said first engaging means is formed of a non-metallic material;
   said second engaging means includes a metal shaft rotatably supported by said lower support;
   said shaft of said second engaging means having said roller of said second engaging means mounted thereon for rotation therewith; and
   said roller of said second engaging means is formed of a non-metallic material.

10. The trackball assembly according to claim 9 including:
    first support means for supporting said shaft of said first engaging means;
    first mounting means for mounting said first support means on said lower support;
    second support means for supporting said shaft of said second engaging means; and
    second mounting means for mounting said second support means on said lower support.

11. The trackball assembly according to claim 10 including:
    said first support means including pivotal mounting means for pivotally mounting said shaft of said first engaging means to enable pivoting of said shaft of said first engaging means;
    said second support means including pivotal mounting means for pivotally mounting said shaft of said second engaging means-to enable pivoting of said shaft of said second engaging means; and
    said bottom ball support having limit means for limiting pivotal movement of said shaft of said first engaging means toward said ball on said bottom ball support and for limiting pivotal movement of said shaft of said second engaging means toward said ball on said bottom ball support.

12. The trackball assembly according to claim 1 in which said mounting means includes means for mounting said bottom ball support on said lower support for both rotational and translational movement.

13. The trackball assembly according to claim 1 in which said mounting means includes:
    a pin of non-circular shape extending from said bottom ball support; and
    said lower support having a circular shaped opening to receive said pin, said opening being larger than said pin to enable said pin to both rotate and translate relative to said opening.

14. A trackball assembly including:
    a lower support;
    an upper support connected to said lower support;
    a bottom ball support supported by said lower support;
    a ball having its bottom supported by said bottom ball support;
    said upper support having an opening through which a portion of said ball protrudes for rotational manipulation by a user;
    sensing means supported by said lower support for sensing the amount and direction of movement of said ball in each of two orthogonal directions during rotation of said ball;
    said sensing means including:
      first engaging means for engaging said ball;
      second engaging means disposed substantially perpendicular to said first engaging means for engaging said ball at a position substantially perpendicular to said first engaging means;
      first responsive means responsive to the amount and direction of movement of said first engaging means for enabling determination of the amount and direction of movement of said ball in one of the orthogonal directions during rotation of said ball;
      and second responsive means responsive to the amount and direction of movement of said second engaging means for enabling determination of the amount and direction of movement of said ball in the other of the two orthogonal directions during rotation of said ball; and non-resilient means supported by said bottom ball support for continuously urging each of said first engaging means and said second engaging means into engagement with said ball with a substantially constant force.

15. The trackball assembly according to claim 14 in which said non-resilient means includes a magnet supported on said bottom ball support, said magnet exerting a substantially equal magnetic force on each of said first engaging means and said second engaging means to continuously urge each of said first engaging means and said second engaging means into engagement with said ball.

16. The trackball assembly according to claim 15 in which:

said first engaging means includes a rotatably mounted roller for engaging said ball;

said second engaging means includes a rotatably mounted roller for engaging said ball, said roller of said first engaging means being disposed substantially perpendicular to said roller of said second engaging means;

said first responsive means includes first encoding means responsive to the amount and direction of rotation of said roller of said first engaging means by said ball during rotation of said ball; and said second responsive means includes second encoding means responsive to the amount and direction of rotation of said roller of said second engaging means by said ball during rotation of said ball.

17. The trackball assembly according to claim 16 in which:

said first engaging means includes a metal shaft rotatably supported by said lower support;

said shaft of said first engaging means having said roller of said first engaging means mounted thereon for rotation therewith;

said roller of said first engaging means is formed of a non-metallic material;

said second engaging means including a metal shaft rotatably supported by said lower support;

said shaft of said second engaging means having said roller of said second engaging means mounted thereon for rotation therewith; and said roller of said second engaging means is formed of a non-metallic material.

18. The trackball assembly according to claim 17 including:

first support means for supporting said shaft of said first engaging means;

first mounting means for mounting said first support means on said lower support;

second support means for supporting said shaft of said second engaging means; and second mounting means for mounting said second support means on said lower support.

19. The trackball assembly according to claim 18 including:

said first support means including pivotal mounting means for pivotally mounting said shaft of said first engaging means to enable pivoting of said shaft of said first engaging means;

said second support means including pivotal mounting means for pivotally mounting said shaft of said second engaging means to enable pivoting of said shaft of said second engaging means; and said bottom ball support having limit means for limiting pivotal movement of said shaft of said first engaging means toward said ball on said bottom ball support and for limiting pivotal movement of said shaft of said second engaging means toward said ball on said bottom ball support.

20. The trackball assembly according to claim 14 in which said non-resilient means includes magnetic means supported on said bottom ball support, said magnetic means exerting a substantially equal magnetic force on each of said first engaging means and said second engaging means to continuously urge each of said first engaging means and said second engaging means into engagement with said ball.

* * * * *